US010255587B2

(12) United States Patent
Mahood et al.

(10) Patent No.: US 10,255,587 B2
(45) Date of Patent: Apr. 9, 2019

(54) SYSTEM AND METHOD FOR BLENDED PRESENTATION OF LOCALLY AND REMOTELY STORED ELECTRONIC MESSAGES

(75) Inventors: Justin B. Mahood, Redmond, WA (US); Robert R. Novitskey, Redmond, WA (US); Shri Vidhya Alagesan, Sammamish, WA (US); Ryan E. Gregg, Seattle, WA (US); Somanath Krishnaswamy, Bellevue, WA (US); Bruce D. Wiedemann, Redmond, WA (US); Saurabh Kumar, Bellevue, WA (US); Joshua A. Meisels, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/352,999

(22) Filed: Jan. 18, 2012

(65) Prior Publication Data
US 2013/0185649 A1 Jul. 18, 2013

(51) Int. Cl.
*G06Q 10/10* (2012.01)
*H04L 29/08* (2006.01)
*H04L 12/58* (2006.01)

(52) U.S. Cl.
CPC ............ *G06Q 10/107* (2013.01); *H04L 51/34* (2013.01); *H04L 67/1095* (2013.01)

(58) Field of Classification Search
CPC .................................................. H04L 67/1095
USPC .......................................... 715/752; 709/206
See application file for complete search history.

(56) References Cited

U.S. PATENT DOCUMENTS

| | | | | |
|---|---|---|---|---|
| 6,061,686 A | * | 5/2000 | Gauvin | H04L 29/06 707/624 |
| 6,212,265 B1 | * | 4/2001 | Duphorne | 379/142.15 |
| 6,219,694 B1 | * | 4/2001 | Lazaridis et al. | 709/206 |
| 6,438,585 B2 | * | 8/2002 | Mousseau et al. | 709/206 |
| 6,446,118 B1 | * | 9/2002 | Gottlieb | 709/217 |

(Continued)

FOREIGN PATENT DOCUMENTS

| | | |
|---|---|---|
| CN | 1284677 | 2/2001 |
| CN | 102177508 A | 9/2011 |

(Continued)

OTHER PUBLICATIONS

Apple, Inc., "iPhone User Guide for iPhone OS 3.1 Software", Sep. 9, 2009, 9 pages.*

(Continued)

*Primary Examiner* — Nicholas Klicos

(57) ABSTRACT

An electronic messaging client caches copies of a subset of electronic messages available in a remote store in a local store of a user device. When the user device is in an online state, the client provides for the blended presentation of electronic messages such that a user can concurrently view information about the electronic messages that have been cached in the local store as well as information about electronic messages that are stored only in the remote store. The client also presents a blended state associated with a container of electronic messages to a user of a user device and enables a user to execute a search of cached electronic messages stored in a local store as well as of electronic messages stored in the remote store.

20 Claims, 8 Drawing Sheets

(56) References Cited

U.S. PATENT DOCUMENTS

| | | | |
|---|---|---|---|
| 6,741,855 B1* | 5/2004 | Martin et al. | 455/419 |
| 6,788,953 B1* | 9/2004 | Cheah et al. | 455/550.1 |
| 6,823,373 B1* | 11/2004 | Pancha et al. | 709/219 |
| 6,983,308 B1 | 1/2006 | Oberhaus et al. | |
| 7,161,978 B2* | 1/2007 | Lu | H04L 49/90 375/219 |
| 7,212,814 B2* | 5/2007 | Wilson et al. | 455/422.1 |
| 7,698,369 B2* | 4/2010 | Addante et al. | 709/206 |
| 8,712,384 B1* | 4/2014 | Goyal et al. | 455/413 |
| 2002/0184317 A1* | 12/2002 | Thankachan | 709/206 |
| 2003/0037261 A1* | 2/2003 | Meffert | G06F 21/10 726/5 |
| 2003/0078983 A1* | 4/2003 | Sullivan et al. | 709/207 |
| 2003/0078985 A1* | 4/2003 | Holbrook et al. | 709/213 |
| 2003/0236842 A1* | 12/2003 | Natarajan et al. | 709/206 |
| 2004/0006706 A1* | 1/2004 | Erlingsson | G06F 21/51 726/30 |
| 2004/0172453 A1* | 9/2004 | De Mendonca | H04L 51/38 709/206 |
| 2004/0179029 A1* | 9/2004 | Ogawa et al. | 345/690 |
| 2005/0182738 A1* | 8/2005 | Prouvost et al. | 706/46 |
| 2005/0188320 A1* | 8/2005 | Bocking | 715/752 |
| 2006/0009243 A1* | 1/2006 | Dahan | H04L 51/04 455/466 |
| 2006/0021029 A1* | 1/2006 | Brickell | G06F 21/51 726/22 |
| 2006/0206570 A1* | 9/2006 | Heidloff et al. | 709/206 |
| 2007/0156825 A1* | 7/2007 | McCarthy et al. | 709/206 |
| 2007/0233801 A1* | 10/2007 | Eren | G06Q 10/107 709/207 |
| 2008/0176540 A1* | 7/2008 | Khedouri et al. | 455/414.1 |
| 2008/0195707 A1* | 8/2008 | May | H04L 51/12 709/206 |
| 2008/0261569 A1* | 10/2008 | Britt et al. | 455/414.1 |
| 2009/0089378 A1* | 4/2009 | Maresh | G06Q 10/107 709/206 |
| 2009/0157834 A1 | 6/2009 | Krishnaswamy | |
| 2009/0210631 A1* | 8/2009 | Bosworth | H04L 67/10 711/141 |
| 2009/0222402 A1 | 9/2009 | Tysowski | |
| 2009/0254624 A1* | 10/2009 | Baudin et al. | 709/206 |
| 2009/0271712 A1* | 10/2009 | Ligh et al. | 715/752 |
| 2010/0174790 A1* | 7/2010 | Dubs et al. | 709/206 |
| 2010/0257230 A1 | 10/2010 | Kroeger et al. | |
| 2010/0257320 A1* | 10/2010 | Bass | G06F 12/121 711/136 |
| 2010/0262922 A1* | 10/2010 | Fan et al. | 715/752 |
| 2010/0318745 A1* | 12/2010 | Wheeler | G06F 17/30902 711/136 |
| 2011/0161270 A1* | 6/2011 | Arnett et al. | 706/46 |
| 2012/0110118 A1* | 5/2012 | Luna | H04L 67/2842 709/217 |
| 2012/0131184 A1* | 5/2012 | Luna | H04W 28/14 709/224 |
| 2012/0135726 A1* | 5/2012 | Luna | H04W 12/06 455/422.1 |
| 2012/0198053 A1* | 8/2012 | Ozhan et al. | 709/224 |
| 2013/0125019 A1* | 5/2013 | Vymenets | G06Q 10/107 715/752 |
| 2013/0159941 A1 | 6/2013 | Langlois et al. | |

FOREIGN PATENT DOCUMENTS

| | | |
|---|---|---|
| EP | 1071029 A2 | 1/2001 |
| JP | H-09-231146 | 9/1997 |
| JP | 2007079888 | 3/2007 |
| JP | 2009151726 A | 7/2009 |
| KR | 10-2000-0028800 A | 5/2000 |
| KR | 1020120005490 A | 1/2012 |
| RU | 2358318 C2 | 6/2009 |
| TW | 201038022 | 10/2010 |
| TW | 201101756 | 11/2011 |

OTHER PUBLICATIONS

Chang et al., "Web Browsing in a Wireless Environment: Disconnected and Asynchronous Operation in ARTour Web Express", 1997, ACM, MOBICOM '97, pp. 260-269.*

Google, Inc., "Android 2.2 User's Guide", May 20, 2010, pp. 1-2, 109-132, 173-192.*

Rhodes et al., "Foundations of Python Network Programming: The comprehensive guide to building network applications with Python", 2010, Apress, Second Edition, pp. i-ii, 197-262.*

Joe Kissell, "The IMAP advantage", Jun. 7, 2006, retrieved from <http://www.macworld.com/article/1051268/julymobilemac.html>, accessed on Aug. 15, 2013, pp. 1-6.*

Google, Inc., "Android 2.2 User's Guide", May 20, 2010, pp. 1-336.*

Sze-jun Tsai, "Getting Gmail anywhere: IMAP versus POP", May 27, 2008, Official Gmail Blog, accessed on May 12, 2015, accessed from <http://gmailblog.blogspot.com/2008/05/getting-gmail-anywhere-imap-versus-pop.html>, pp. 1-3.*

Graham Huber, "POP vs IMAP: The difference? Anyone'?", Feb. 2, 2010, mail2web, accessed on May 12, 2015, accessed from <http://mail2web.com/blog/2010/02/pop-imap-difference/>, pp. 1-4.*

"Gmail Goes Offline with Google Gears", Retrieved at <<http://lifehacker.com/5140668/gmail-goes-offline-with-google-gears>>, Retrieved Date: Nov. 21, 2011, pp. 5.

Tschabitscher, Heinz, "How to Access Your IMAP Email Inbox Offline with Mozilla Thunderbird", Retrieved at <<http://email.about.com/od/mozillathunderbirdtips/qt/Access_Your_IMAP_Email_Inbox_Offline_in_Mozilla_Thunderbird.htm>>, Retrieved Date: Nov. 22, 2011, 1 Page.

"Windows Live Mail for Windows XP", Retrieved at <<http://explore.live.com/windows-live-mail-xp>>, Retrieved Date: Nov. 22, 2011, 1 Page.

"Offline Google Mail", Retrieved at <<https://chrome.google.com/webstore/detail/ejidjjhkpiempkbhmpbfngldlkglhimk>>, Retrieved Date: Nov. 22, 2011, pp. 2.

"International Search Report", dated Jun. 12, 2013, Application No. PCT/US2013/021090, Filed Date: Mar. 11, 2013, pp. 11.

Supplementary Search Report Issued in European Patent Application No. 13738171.1, dated Jul. 22, 2015, 8 Pages.

"Use Gmail Offline with Google Gears", Published on: Jan. 28, 2009, Available at: <https://web.archive.org/web/20090324031231/http://geniushackers.com/blog/2009/01/28/use-gmail-offline-with-google-gears>, 6 pages.

European Summons to Attend Oral Hearing in Application 13738171.1, dated Jan. 27, 2017, 8 pages.

Japanese Office Action in Application 2014-553329, dated Jan. 4, 2017, 6 pages.

Office Action Issued in Chinese Patent Application No. 201380005810.X, dated May 26, 2016, 14 Pages.

European Office Action in Application 13738171.1, dated Jul. 26, 2016, 9 pgs.

Taiwanese Office Action in Application 102102023, dated Oct. 13, 2016, 13 pages.

"Office Action Issued in Australian Patent Application No. 2013209993", dated Jun. 6, 2017, 3 Pages.

"Third Office Action Issued in Chinese Patent Application No. 201380005810.X", dated Jun. 1, 2017, 13 Pages.

Russian Office Action Issued in Patent Application No. 2014129510, dated Nov. 11, 2016, 6 Pages.

Chinese Office Action in Application 201380005810.X, dated Nov. 24, 2016, 10 pages. (with English translation).

Mexican Office Action in Application MX/a/2014/008564, dated Nov. 15, 2016, 5 pages. (With English Summary).

Taiwanese Office Action in Application 102102023, dated Feb. 6, 2017, 12 pages. (With English Summary).

"Office Action Issued in Japanese Patent Application No. 2014553329", dated Sep. 11, 2017, 6 Pages.

"Office Action Issued in Australian Patent Application No. 2013209993", dated Oct. 17, 2017, 4 Pages.

"Office Action Issued in Chinese Patent Application No. 201380005810.X", dated Dec. 20, 2017, 10 Pages.

(56) References Cited

OTHER PUBLICATIONS

"Office Action Issued in Korean Patent Application No. 10-2014-7020077", dated Nov. 16, 2018, 15 Pages.
"Office Action Issued in Canadian Patent Application No. 2,863,277", dated Sep. 25, 2018, 4 Pages.

* cited by examiner

SYSTEM AND METHOD FOR BLENDED PRESENTATION OF LOCALLY AND REMOTELY STORED ELECTRONIC MESSAGES

BACKGROUND

Many modern e-mail clients provide a local cache for fast and offline access to e-mail messages and other data. Such local cache may include a complete copy of a user's mailbox that is also stored on an e-mail server. Over the last decade, mailbox storage quotas have grown exponentially, and are now many gigabytes in size. For the majority of users, there is little or no utility in providing offline access to extremely old data. Moreover, because mailboxes have become so large, it has become increasingly unwieldy to download mailbox data from an e-mail server as well as increasingly difficult to operate on such data locally without significantly impacting performance. Also, if the device upon which the e-mail client is installed has a limited storage footprint (as is the case with many modern mobile devices), then the local cache may consume an unacceptable amount of the available storage space.

Some mobile e-mail clients attempt to address the foregoing issues by downloading and locally storing only a subset of a user's e-mails that are available on an e-mail server. Such subset may be defined in terms of a rolling time window. For example, only e-mails received over the past seven days may be maintained in a local cache at any given time. In certain implementations, the size of the time window may be fixed, while in other implementations, the size of the time window may be configurable by a user.

Although such mobile e-mail clients are able to limit the storage requirements of the local cache by downloading only the most recently-received e-mails, these e-mail clients do not provide a user with affordances or any information about the state of older e-mail messages that reside only on the e-mail server. Typically, such older e-mail messages can only be accessed by widening the time window (in those implementations that support a configurable time window), by running a search against such older e-mails, or by incrementally downloading more items. In each case, copies of the older e-mails must be stored in the local cache, thereby consuming additional storage space on the user's mobile device.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
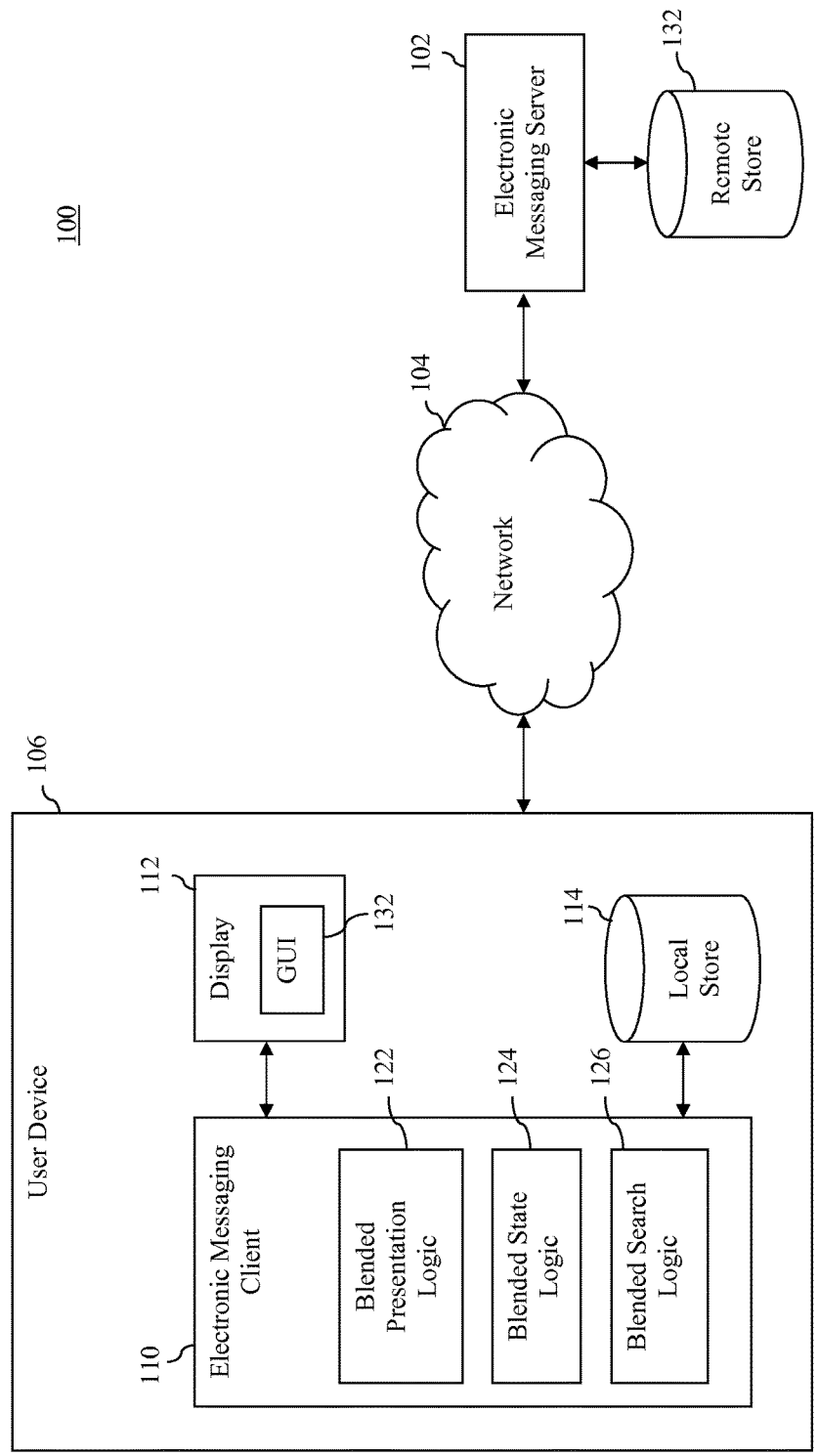
FIG. 1 is a block diagram of an example system that provides for the blended presentation of locally-stored and remotely-stored electronic messages in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Embodiments described herein download copies of a subset of electronic messages available in a remote store to a local store of a user device. This enables a user of the user device to access a subset of his or her electronic messages even when the user device is in an offline state. When the user device is in an online state, embodiments described herein provide for the blended presentation of electronic messages such that a user can concurrently view information about the electronic messages that have been cached in the local store as well as information about electronic messages that are stored only in the remote store. Information about such electronic messages may be presented to the user in a seamless manner, so that the user is given the impression that all the electronic messages are part of a single unified repository, even though the information about and contents of such electronic messages may be obtained from different stores. Furthermore, when the user device is in an online state, the user can view information about and/or the contents of remotely-stored electronic messages without requiring such remotely-stored electronic messages to be copied to the local store.

Since embodiments described herein download and locally store only a subset of a user's electronic messages that are available in a remote store, these embodiments reduce the amount of network bandwidth needed for downloading electronic messages, the amount of processing power required to synchronize locally-stored electronic messages with the remote store, and the amount of storage spaced consumed by the local store.

Furthermore, embodiments described herein represent an improvement over conventional electronic messaging clients that download and locally store only a subset of a user's remotely-stored electronic messages, since, as discussed in the Background Section above, such conventional electronic messaging clients do not provide a user with information about or access to electronic messages that reside only in the remote store. Rather, to obtain access to electronic messages that reside only in the remote store, such conventional electronic messaging clients may require a user to widen a time window used to determine which electronic messages are locally cached, to run a search against such older e-mails, or to incrementally download more electronic messages. In each case, a remotely-stored electronic message can only be viewed on the user device by copying it to the local store, thereby consuming storage space. In contrast, as noted above, embodiments described herein allow a user to view information about and/or the contents of remotely-stored electronic messages without requiring such remotely-stored electronic messages to be downloaded to the local store.

Embodiments described herein are also capable of presenting a blended state associated with a container of electronic messages to a user of a user device in a scenario in which some of the electronic messages stored in the container are cached in a local store of the user device and some of the electronic messages stored in the container are available only in a remote store. The blended state may comprise, for example, an item count that describes a number of electronic messages in the container having a particular state (e.g., included or not included in the container, read or unread, flagged or unflagged, or the like).

Generally speaking, in an embodiment in which the blended state comprises an item count for a container, the item count may be determined by taking a sum of a local item count and a delta amount. The local item count represents the number of electronic messages stored in the local store of the user device that are included in the container and have the particular state. The delta amount represents a last known difference between a remote item count and the local item count, wherein the remote item count represents a number of electronic messages stored in the remote store that are included in the container and have the particular state. By determining the item count for the container in this manner, embodiments described herein are able to present the user with an updated item count for the entire container even when the user takes some action that changes only the local item count while the user device is in an offline state. Furthermore, by determining the item count for the container in this manner, embodiments described herein are able to present the user with an updated item count for the entire container during a synchronization process, wherein such updated item count reflects changes to the local item count resulting from such synchronization process.

Additionally, embodiments described herein are also capable of enabling a user of a user device to execute a search of cached electronic messages stored in a local store of the user device as well as of electronic messages stored in a remote store accessible to an electronic messaging server when the user device is determined to be connected to the electronic messaging server. The search results obtained from the searches against the local and remote stores may be presented in the same GUI. When the user requests to view the contents of an electronic message that is identified in the search results and cached in the local store, the contents of the electronic message is obtained from the local store. When the user requests to view the contents of an electronic message that is identified in the search results and is only available in the remote store, the contents of the electronic message will be obtained from the remote store but not cached in the local store.

II. Example System for Blended Presentation of Electronic Messages

FIG. 1 is a block diagram of an example system 100 that provides for the blended presentation of locally-stored and remotely-stored electronic messages in accordance with an embodiment. As used herein, the term "electronic message" is intended to broadly represent any type of message or item of information that can be transmitted in electronic form (i.e., as signals). Examples of electronic messages include but are not limited to e-mail messages, text messages, microblog posts, calendar entries, tasks, notes, contacts, or the like.

As shown in FIG. 1, system 100 includes at least one electronic messaging server 102 and at least one user device 106 that can be communicatively connected thereto via a network 104.

Electronic messaging server 102 is intended to represent a processor-based electronic device that is configured to receive electronic communications from and send electronic communications to various other entities, including other electronic messaging servers. Electronic messaging server 102 is further configured to interact with electronic messaging clients that are installed on user devices (such as user device 106) to enable users thereof to access electronic messages that have been received by electronic messaging server 102 and to send electronic messages to other user devices via electronic messaging server 102. Copies of electronic messages received and sent by electronic messaging server may be stored in remote store 132. Remote store 132 is intended to broadly represent any storage device or system suitable for storing copies of electronic messages.

In one embodiment, electronic messaging server 102 manages a separate repository of electronic communications for each of a plurality of users, wherein each such repository may be stored in remote store 132. Each of the plurality of users may access at least a portion of his or her repository by interacting with electronic messaging server 102 using a suitable electronic messaging client. In an embodiment in which the electronic communications comprise e-mails, such repositories may comprise user e-mail mailboxes. As is known in the art, a user e-mail mailbox may further comprise any number of sub-mailboxes.

Network 104 is intended to represent any type of network or combination of networks suitable for facilitating communication between electronic devices, such as electronic messaging server 102 and user device 106. Network 104 may include, for example and without limitation, a wide area network, a local area network, a private network, a public network, a packet network, a circuit-switched network, a wired network, and/or a wireless network.

User device 106 is intended to represent a processor-based electronic device that is capable of executing one or more software components that are installed thereon. By way of example only and without limitation, user device 106 may comprise a personal computer, a laptop computer, a tablet computer, a smart phone, a smart television, a gaming console, a personal media player, a personal digital assistant, an embedded device, or the like.

As further shown in FIG. 1, user device 106 includes an electronic messaging client 110 installed thereon. Electronic messaging client 110 comprises software that, when executed by user device 106, interacts with electronic messaging server 102 to enable a user to draft, send, receive, review, organize and otherwise manage electronic messages. In an embodiment in which the electronic messages comprise e-mail messages, electronic messaging client 110 may comprise an e-mail client, such as a version of MICROSOFT® OUTLOOK®, published by Microsoft Corporation of Redmond, Wash. However, this example is not intended to be limiting.

User device 106 also includes a display 112 to which installed software components may render graphical content for viewing by a user thereof. For example, electronic messaging client 110 is configured to cause a graphical user interface (GUI) 132 to be rendered to display 112. GUI 132 includes means by which a user can invoke the various functions and features of electronic messaging client 110.

User device 106 still further includes a local store 114, which may also be referred to herein as a local cache. Local store 114 is intended to broadly represent any type of storage device or system suitable for storing electronic messages on user device 106. Electronic messaging client 110 is configured to periodically interact with electronic messaging server 102 via network 104 to obtain copies of electronic messages that are available to electronic messaging client 110 in remote store 132 and to store such copies in local store 114. For example, in an embodiment in which the electronic messages comprise e-mails, electronic messaging client 100 may periodically interact with electronic messaging server 102 via network 104 to obtain copies of e-mails from a user mailbox stored in remote store 132 and store such copied e-mail in local store 114. Once a copy of an electronic message has been stored in local store 114, electronic messaging client 110 can make the electronic message and information concerning the same accessible to a user of user device 106 even when user device 106 is not capable of connecting to electronic messaging server 102.

In an embodiment, electronic messaging client 110 and/or electronic messaging server 102 are configured such that only a subset of the electronic messages that are available to electronic messaging client 110 in remote store 132 can be downloaded for storage in local store 114. For example, in an embodiment in which electronic messaging server 104 comprises an e-mail server, remote store 132 may store a complete copy of a user's e-mail mailbox and electronic messaging client 110 may operate to periodically download and locally store copies of only a subset of the e-mail messages in that mailbox.

A variety of approaches may be used to determine which subset of electronic messages is downloaded and stored in local store 114. In one embodiment, a rolling time window (also referred to herein as a "synchronization window") is utilized. In accordance with such an approach, only electronic messages that have been received within the rolling time window are downloaded and stored in local store 114. The time window is said to be "rolling" because it shifts forward in time (e.g., the last 7 days, the last 3 months, etc.). As the time window shifts, electronic messages that are no longer within the time window "age out" and are removed from local store 114. Various temporal resolutions may be used to determine when the time window is to be shifted. For example, in one embodiment, the temporal resolution is 1 day.

Depending upon the implementation, the length of the rolling time window may or may not be configurable by a user. For example, in one embodiment, the user may interact with electronic messaging client 110 to select one of a plurality of predefined rolling time windows, each having a different length. In a specific implementation, the user may select between a 1-month, 3-month, 6-month, and 12-month time window. In certain implementations, the user may select not to use a time window, in which case a copy of all the electronic messages stored in remote store 132 will be downloaded and stored in local store 114. However, that mode of operation is not necessarily germane to the embodiments described herein dealing with blended presentation of electronic messages.

It is noted that the description of a rolling time window as provided above represents only one way by which a subset of the electronic messages in remote store 132 can be selected for downloading and storage in local store 114. Other methods may be used. Furthermore, the method used may vary depending upon the type of electronic message (e.g., if the electronic messages represent calendar data, a rolling time window may not be used).

Since, as discussed above, electronic messaging client 110 downloads and stores in local store 114 at least some of a user's electronic messages that are available in remote store 132, electronic messaging client 110 can enable a user to obtain information about and review the contents of any electronic message stored in local store 114 even when user device 106 is incapable of connecting to electronic messaging server 102. Furthermore, since electronic messaging client 110 can download and store in local store 114 only a subset of the user's electronic messages that are available in remote store 132, electronic messaging client 110 can reduce the amount of bandwidth needed on network 104 for downloading electronic messages, the amount of processing power of user device 106 required to synchronize locally-stored electronic messages with remote store 132, and the amount of storage spaced consumed by local store 114 as compared to an implementation in which all of a user's electronic messages available in remote store 132 are copied to local store 114.

As also shown in FIG. 1, electronic messaging client 110 includes blended presentation logic 122, blended state logic 124 and blended search logic 126. In an embodiment, each of these components comprises a software module that is invoked by or form part of electronic messaging client 110.

Blended presentation logic 122 operates to determine when user device 106 is connected to electronic messaging server 102. In response to determining that user device 106 is connected to electronic messaging server 102, blended presentation logic 122 operates to provide for the blended presentation of electronic messages via GUI 132 such that a user can concurrently view information about the electronic messages that have been cached in local store 114 as well as information about electronic messages that are stored only in remote store 132. Information about such electronic messages may be presented to the user in a seamless manner, so that the user is given the impression that all the electronic messages are part of a single unified repository, even though the information about and contents of such electronic messages may be obtained from different stores. Furthermore, blended presentation logic 122 operates such that, when user device 106 is connected to electronic messaging server 102, the user can view information about and/or the contents of electronic messages stored in remote store 132 without requiring such remotely-stored electronic messages to be copied to local store 114. Further details concerning the manner of operation of blended presentation logic 122 will be provided below in Section II.A.

Blended state logic 124 operates to present a blended state associated with a container of electronic messages to a user of user device 106 in a scenario in which some of the electronic messages stored in the container are cached in local store 114 and some of the electronic messages stored in the container are available only in remote store 132. The blended state may comprise, for example, an item count that describes a number of electronic messages in the container having a particular state (e.g., included or not included in the container, read or unread, flagged or unflagged, or the like).

Generally speaking, in an embodiment in which the blended state comprises an item count for a container, blended state logic 124 may determine the item count by taking a sum of a local item count and a delta amount. The local item count represents the number of electronic messages stored in local store 114 that are included in the container and have the particular state. The delta amount represents a last known difference between a remote item count and the local item count, wherein the remote item count represents a number of electronic messages stored in remote store 132 that are included in the container and have the particular state. By determining the item count for the container in this manner, blended state logic 124 is able to present the user with an updated item count for the entire container even when the user takes some action that changes only the local item count while user device 106 is in an offline state. Furthermore, by determining the item count for the container in this manner, blended state logic 124 is able to present the user with an updated item count for the entire container during a synchronization process, wherein such updated item count reflects changes to the local item count resulting from such synchronization process. Further details concerning the manner of operation of blended state logic 124 will be provided below in Section II.B.

Blended search logic 126 operates to enable a user of user device 106 to execute a search of cached electronic messages stored in local store 114 as well as of electronic messages stored in remote store 132 when user device 106 is determined to be connected to electronic messaging server 102. The search results obtained from the searches against local store 114 and remote store 132 may both be presented in GUI 132. When the user requests to view the contents of an electronic message that is identified in the search results and cached in local store 114, blended search logic 126 will obtain the contents of the electronic message from local store 114. When the user requests to view the contents of an electronic message that is identified in the search results and is only available in remote store 132, blended search logic 126 will obtain the contents of the electronic message from remote store 132 via interaction with electronic messaging server 102 but will not cache the contents in local store 114. Further details concerning the manner of operation of blended search logic 126 will be provided below in Section II.C.

A. Example Blended Presentation Techniques

Figure 2:
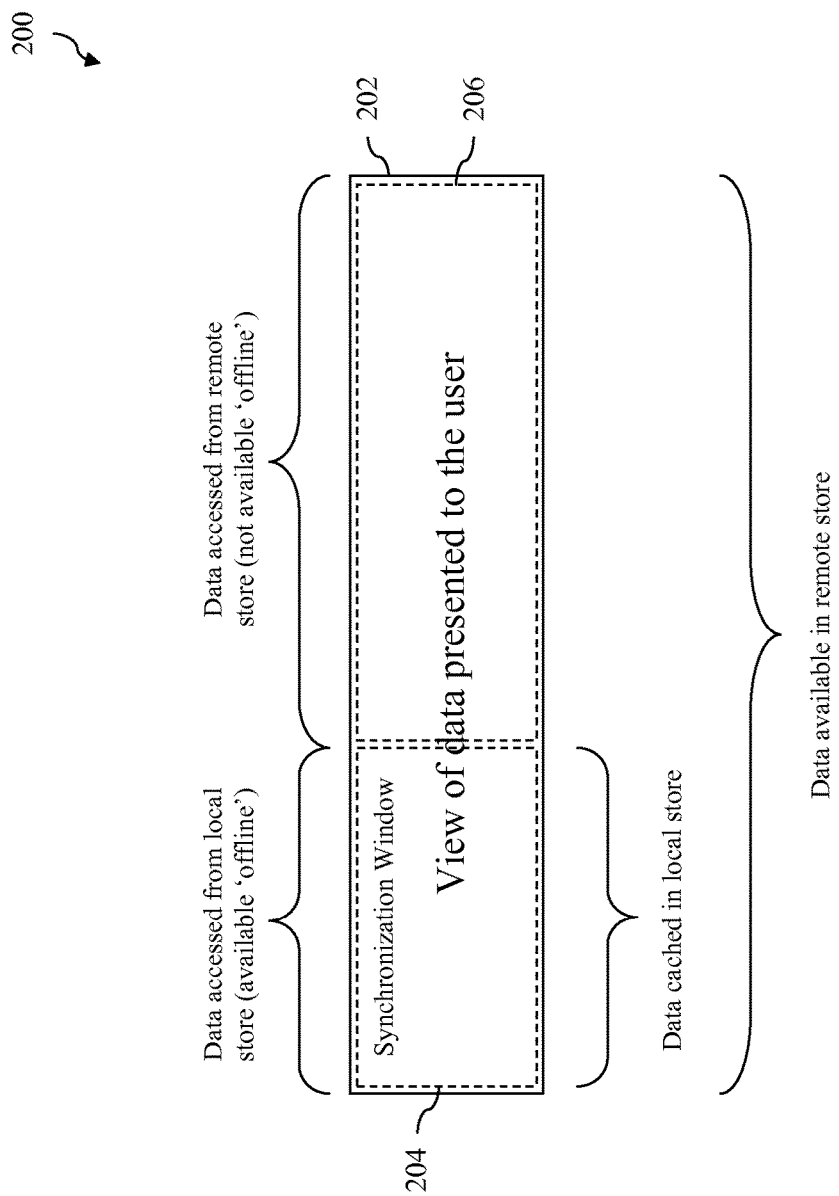
FIG. 2 is a block diagram that depicts a display area that may be used to present locally-stored and remotely-stored electronic messages in a blended manner in accordance with an embodiment.

FIG. 2 is a block diagram 200 that is intended to demonstrate the manner in which blended presentation logic 122 operates to provide for the blended presentation of electronic messages via GUI 312 when user device 106 is determined to be connected to electronic messaging server 102.

In FIG. 2, a display area 202 of GUI 132 that is managed by blended presentation logic 122 is generally represented. Display area 202 may comprise, for example, a window or viewing pane within GUI 132 within which information about a user's electronic messages is presented. Such information may broadly include any item of information about an electronic message. For example, in an embodiment in which the electronic messages comprise e-mail messages, such information may include but is not limited to a sender of the e-mail message, a subject of the e-mail message, a date and/or time the e-mail message was sent, a date and/or time the e-mail message was received, state information concerning the e-mail message (e.g., read, unread, flagged, not flagged), or the like.

The information about the electronic messages displayed within display area 202 may be organized in a variety of ways depending upon the implementation. For example, such information may be presented in the form of a table or list, with information about each electronic message being displayed in a corresponding row of the table or as a corresponding item in the list. In accordance with another implementation, information about the electronic messages may be presented in association with icons that represent the corresponding electronic messages. Still other manners of presentation may be used.

The information about the electronic messages may be sorted or otherwise organized in accordance with one or more system-defined and/or user-defined criteria. For example, the information about the electronic messages may be sorted based on the date and time of receipt of the electronic messages. In an embodiment in which the electronic messages are presented as a list, the use of such sorting criteria may result in information about the most recently-received electronic messages appearing at the beginning of the list and information about the oldest received electronic messages appearing at the end of the list. However, this is only an example, and a wide variety of criteria may be used to sort or otherwise organize the information about the electronic messages.

In an embodiment in which the electronic messages comprise e-mail messages stored in an e-mail mailbox that can include sub-mailboxes and/or sub-folders, the e-mail messages about which information is displayed in display window 202 may comprise e-mail messages stored in a particular mailbox, sub-mailbox or sub-folder.

As further shown in FIG. 2, a first portion 204 of display area 202 is used to present information about electronic messages that fall within a synchronization window. As discussed above, such a synchronization window may be utilized to determine which electronic messages are copied from remote store 132 to local store 114. Since the electronic messages about which information is displayed in first portion 204 of display are 202 are stored in local store 114, in an embodiment, blended presentation logic 122 obtains the electronic message information that is displayed within first portion 204 of display area 202 from local store 114 rather than from remote store 132. Such data may be said to be available "offline" as denoted in FIG. 2.

As also shown in FIG. 2, a second portion 206 of display area 202 is used to present information about electronic messages that fall outside the synchronization window and thus are not stored in local store 114. Since the electronic messages about which information is displayed in second portion 206 of display are 202 are not stored in local store 114, in an embodiment, blended presentation logic 122 obtains the electronic message information that is displayed within second portion 206 of display area 202 from remote store 132 via interaction within electronic messaging server 102 when it is determined that user device 106 is connected to electronic messaging server 102. Such data may be said not to be available "offline" as denoted in FIG. 2.

By concurrently presenting information about electronic messages that are locally cached in local store 114 and information about electronic messages that are remotely stored in remote store 132 in the same display area 202 as shown in FIG. 2, blended presentation logic 122 can provide a user with the impression that all the electronic messages are part of a single unified repository, even though blended presentation logic 122 may obtain the information about and contents of such electronic messages from different stores. Stated another way, blended presentation logic 122 can provide the user with a sense that they have access to all of the electronic messages stored in remote store 132 even though blended presentation logic 122 may obtain some of the electronic messages and information about those electronic messages from local store 114.

To achieve this blending effect, blended presentation logic 122 may present information about locally-stored and remotely-stored electronic messages in essentially the same form and/or manner, such that the user cannot easily determine which electronic messages are stored locally and which are stored remotely. However, in an alternate embodiment, some sort of visual indication may be provided that can be used to distinguish locally-stored from remotely-stored electronic messages.

In certain embodiments, for each electronic message about which information is presented in display area 202, a means is also presented by which a user can cause the contents of such electronic message to be displayed in GUI 132. For example, the means may comprise a component that is presented in association with the information about each electronic message that, when interacted with by the user, causes the contents of that electronic message to be displayed within GUI 132. For example, in an embodiment in which information about each electronic message is displayed as an item in a list, a user may be enabled to view the contents of an electronic message by clicking on the corresponding item in the list. Still other user interface components may be utilized to facilitate the selective viewing of the contents of an electronic message about which information is presented in display area 202.

In further accordance with the example embodiment shown in FIG. 2, once a user has selected an electronic message for viewing, blended presentation logic 122 will obtain the contents of the electronic message and display such contents within GUI 132. If a copy of the selected electronic message is stored in local store 114, then blended presentation logic 122 will obtain the contents of the electronic message from local store 114. However, if there is no copy of the selected electronic message stored in local store 114 (i.e., the selected electronic message is outside the synchronization window), then blended presentation logic 122 will obtain the contents of the electronic message from remote store 132 via interaction with electronic messaging server 102. In this latter case, blended presentation logic 122 will not store a copy of the remotely-stored electronic message in local store 114 as part of the presentation process. That is to say, although the contents of the remotely-stored electronic message may be temporarily buffered within memory of user device 106 to facilitate the display thereof, once the user has closed the portion of GUI 132 that is used to view the contents of the remotely-stored electronic message, such buffered data may be discarded. Of course, it is possible that in certain situations (e.g., for performance reasons), blended presentation logic 122 may cause a copy of the remotely-stored electronic message to be stored within local store 114.

In one embodiment, blended presentation logic 122 may initially only present information about electronic messages that fall within the synchronization window within display area 202 even though it has been determined that user device 106 is connected to electronic messaging server 102. In further accordance with such an embodiment, blended presentation logic 122 may provide a component within GUI 132 that a user may interact with to cause the information concerning electronic messages falling outside the synchronization window to also be displayed within display area 202 in a blended manner as described above. Such interactive component may include or be accompanied by a visual indication of its function. For example, such interactive component may include or be accompanied by text stating "There are more messages on the server, please click here to view them," "Click here to see more messages" or something of the like. However, these are merely examples only and are by no means intended to be limiting.

It is noted that the depiction of display area 202 has been provided by way of illustration only. Display area 202 may be of any size or shape depending upon the implementation. Furthermore, the entirety of display area 202 may not be viewable at one time within GUI 132 and/or display 112 and scrolling or other similar mechanisms known in the art may be used to view selected portions of display area 202.

Furthermore, although FIG. 2 may seem to suggest that information about the electronic messages that are included within the synchronization window are presented as a contiguous unit that is separate from the information about the electronic messages that are not within the synchronization window, it is entirely possible that such information may be intermixed throughout display area 202. For example, in an embodiment in which the information is presented as a list, the first electronic message about which information is presented in the list may be outside the synchronization window, the second electronic message about which information is presented in the list may be inside the synchronization window, and the third electronic information about which information is presented in the list may be outside the synchronization window. To put it another way, portions 204 and 206 of display area 202 may be intermixed or intermingled. This may occur for example, due to the manner in which such information is sorted or for other reasons.

Figure 3:
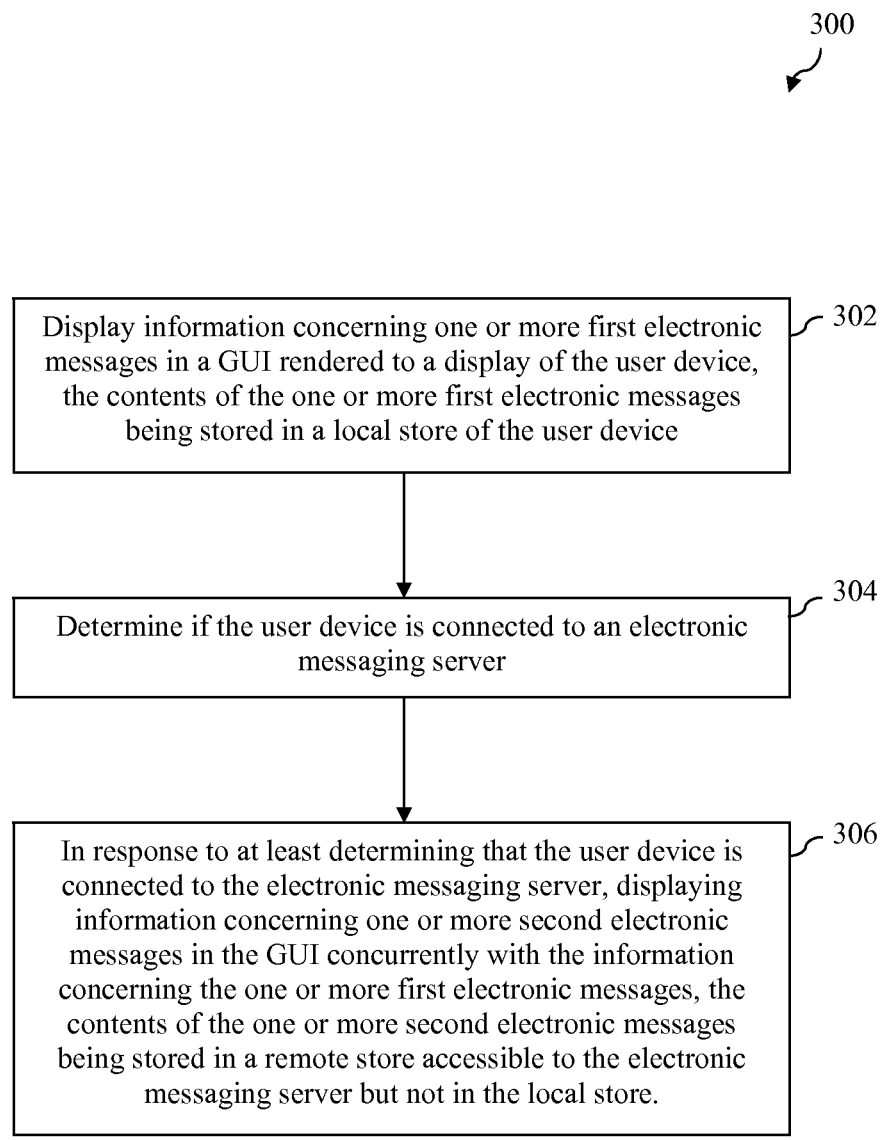
FIG. 3 depicts a flowchart of a method for providing a blended presentation of locally-stored and remotely-stored electronic messages in accordance with an embodiment.

FIG. 3 depicts a flowchart 300 of a method for providing a blended presentation of locally-stored and remotely-stored electronic messages in accordance with an embodiment. The method of flowchart 300 may be performed, for example, by blended presentation logic 122 as described above in reference to system 100 of FIG. 1. However, the method is not limited to that embodiment and may be implemented by other components or systems entirely.

As shown in FIG. 3, the method of flowchart 300 begins at step 302, in which information concerning one or more first electronic messages is displayed in a GUI rendered to a display of a user device, wherein the contents of the one or more first electronic messages are stored in a local store of the user device. For example, this step may entail displaying information concerning electronic messages within a synchronization window to GUI 132 rendered to display 112 of user device 106, wherein such electronic messages are stored in local store 114 of user device 106.

At step 304, a determination is made as to whether the user device is connected to an electronic messaging server. For example, this step may entail determining if user device 106 is connected to electronic messaging server 106. A variety of methods may be used to determine if such a connection exists, including but not limited to requiring an exchange of messages between user device 106 and electronic messaging server 102 or simply determining that user device 106 has a working connection to network 104.

At step 306, in response to at least determining that the user device is connected to the electronic messaging server, information concerning one or more second electronic messages is displayed in the GUI concurrently with the information concerning the one or more first electronic messages, wherein the contents of the one or more second electronic messages are stored in a remote store accessible to the electronic messaging server but not in the local store. For example, this step may entail, in response to at least determining that user device 106 is connected to electronic messaging server 102, displaying information concerning electronic messages not stored within a synchronization window to GUI 132 rendered to display 112 of user device 106, wherein such electronic messages are stored in remote store 132 accessible to electronic messaging server 102 but not in local store 114.

In one embodiment, the method of flowchart 300 may further comprise providing a user interface component within the GUI that the user may interact with to cause the information concerning the one or more second electronic messages to be displayed in the GUI concurrently with the information concerning the one or more first electronic messages. In further accordance with such an embodiment, step 306 may be performed in response to at least determining that the user device is connected to the electronic messaging server and that the user has interacted with the user interface component. As discussed above in reference to FIG. 2, such user interface component may include or be accompanied by a visual indication of its function. For example, such interactive component may include or be accompanied by text stating "There are more messages on the server, please click here to view them," "Click here to see more messages" or something of the like.

In a further embodiment, the method of flowchart 300 may also comprise providing a user interface component within the GUI that the user may interact with to cause the contents of a selected one of the one or more first electronic messages to be displayed in the GUI and, then, in response to determining that the user has interacted with the user interface component, obtaining the contents of the selected one of the one or more first electronic messages from the local store for display in the GUI.

In a still further embodiment, the method of flowchart 300 may also comprise providing a user interface component within the GUI that the user may interact with to cause the contents of a selected one of the one or more second electronic messages to be displayed in the GUI and then, in response to determining that the user has interacted with the user interface component, obtaining the contents of the selected one of the one or more second electronic communications from the remote store for display in the GUI without saving a copy of the contents of the selected one of the one or more second electronic messages in the local store.

B. Example Techniques for Presentation of Blended State Information

Figure 4:
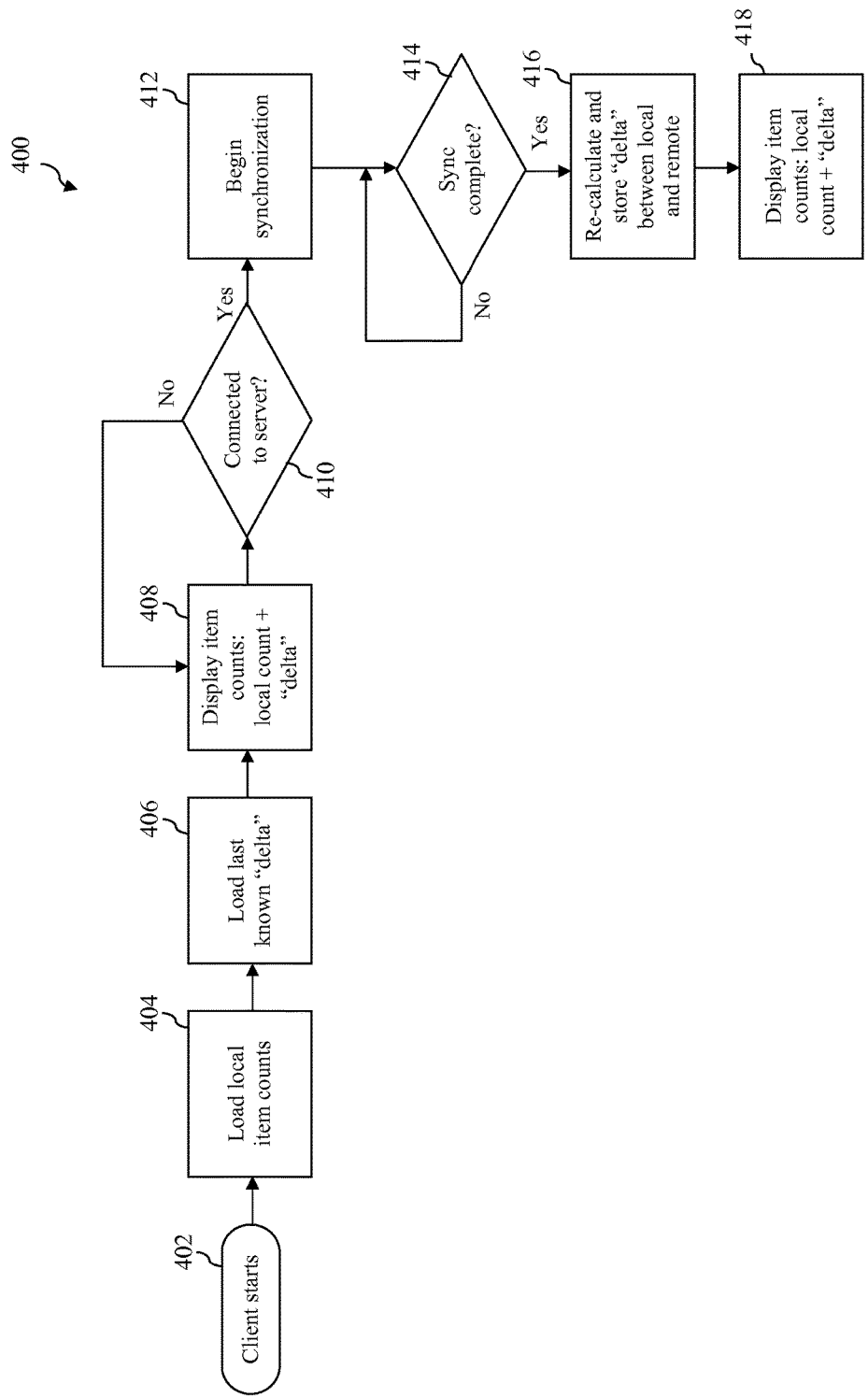
FIG. 4 depicts a flowchart of a method for presenting a blended state associated with a container of locally-stored and remotely-stored electronic messages in accordance with an embodiment.

FIG. 4 depicts a flowchart 400 of a process by which blended state logic 124 may operate to present a blended state associated with a container of electronic messages to a user of user device 106 in a scenario in which some of the electronic messages stored in the container are cached in local store 114 and some of the electronic messages stored in the container are available only in remote store 132. The container may comprise, for example, a folder that is used to store all or a subset of a user's electronic messages. The method of flowchart 400 is focused on the manner in which blended state is first presented to the user after electronic messaging client 110 is launched. In the method of flowchart 400, the blended state comprises an item count that describes a number of electronic messages in the container having a particular state. Such particular state may comprise, for example and without limitation: included or not included in the container, read or unread, flagged or unflagged, or the like.

For the sake of illustration only, the method of flowchart 400 will now be described in reference to various components of system 100 as described above in reference to FIG. 1. However, persons skilled in the relevant art(s) will appreciate that the method may be implemented by other components or systems as well.

As shown in FIG. 4, the method of flowchart 400 begins at step 402, in which electronic messaging client 110 is started. Depending upon the implementation, this step may occur in a variety of ways. For example, this step may occur when a user of user device 106 launches electronic messaging client 110 via interaction with an operating system of user device 106 or some other component thereof.

After step 402, control flows to step 404, during which blended state logic 124 loads one or more local item counts associated with a container, wherein such local item counts are stored in local storage of user device 106 (e.g., local store 114). In accordance with this method, a local item count comprises a representation of a number of electronic messages stored in local store 114 that are included in the container and have a particular state. Local item counts may be maintained for different types of state. For example, for a given container, a local item count may be maintained that represents: a number of electronic messages in the container that are stored in local store 114, a number of electronic messages in the container that are read or unread and are stored in local store 114, a number of electronic messages that are flagged or unflagged and stored in local store 114, or the like.

After step 404, control flows to step 406, during which blended state logic 126 loads one or more delta amounts associated with a container, wherein such delta amounts are stored in local storage of user device 106 (e.g., local store 114). In accordance with this method, a delta amount represents a last known difference between a remote item count and a local item count for the container, wherein the remote item count represents a number of electronic messages stored in remote store 132 that are included in the container and have a particular state.

After step 406, control flows to step 408, during which blended state logic 124 calculates item counts for the container by summing each local item count loaded during step 404 with a corresponding delta amount loaded during step 406. For example, this step may entail adding a local item count that specifies the total number of items included in the container and stored in local store 114 to a delta amount that specifies the last known difference between the total number of items included in the container and stored in remote store 132 and the local item count. As another example, this step may entail adding a local item count that specifies the total number of unread items included in the container and stored in local store 114 to a delta amount that specifies the last known difference between the total number of unread items included in the container and stored in remote store 132 and the local item count.

During step 408, blended state logic 124 also presents the item counts so calculated to GUI 132 so that they may be viewed by a user of user device 106. This step may comprise displaying the item counts in a location or manner that indicates that such item counts correspond to the container for which they have been calculated (e.g., next to an iconic representation of the container, in a status bar of a navigation pane that displays information about electronic messages in the container, or the like).

After step 408, control flows to decision step 410, during which blended state logic 124 determines whether user device 106 is connected to electronic messaging server 102 or not. A variety of methods may be used to determine if such a connection exists, including but not limited to requiring an exchange of messages between user device 106 and electronic messaging server 102 or simply determining that user device 106 has a working connection to network 104.

As shown in FIG. 4, if it is determined during decision step 406 that user device 106 is not connected to electronic messaging server 102, then control returns to step 408, during which blended state logic 126 continues to show the items counts for the container as a sum of the local items counts for the container and the corresponding delta amounts obtained during step 406. It is noted that while user device 106 is offline, the local item counts loaded during step 404 may be updated as result of the performance of any of a number of actions by a user of user device 106, as will be discussed below in reference to flowchart 500 of FIG. 5. Thus, the item counts for the container that are displayed during step 408 while user device 106 is offline will be the total of the most current local item counts for the container (as impacted by the user's offline activities) plus the corresponding delta amounts obtained during step 406. It is noted that, in certain embodiments, when blended state logic 124 determines that user device 106 is not connected to electronic messaging server 102 and that the delta amount for a particular container is greater than zero (indicating that there are electronic messages available in remote store 132 that are not cached in local store 114), then blended state logic 124 may cause an indicator to be presented that notifies a user that additional electronic messages are available in remote store 132. For example, such indicator may comprise text rendered to GUI 132 that states "There are more items—connect to the server to view them," although this is merely one example. In further accordance with such an embodiment, when the delta amount for a particular container is zero (indicating that there are all electronic messages available in remote store 132 are cached in local store 114), no such indication may be presented.

However, if it is determined during decision step 410 that user device 106 is connected to electronic messaging server 102, then control flows to step 412, during which a synchronization process is initiated that is intended to synchronize the state of the electronic messages stored in local store 114 and the electronic messages stored in remote store 132. Such synchronization process is performed because the state of the electronic messages stored in local store 114 and/or remote store 132 may have changed (and thus become unsynchronized) while user device 106 was offline or while electronic messaging client 110 was not running. For example, the user may have changed the state of one or more electronic messages stored in local store 114 while user device 106 was offline or while electronic messaging client 110 was not running. As another example, electronic messaging server 102 may have changed the state of one or more electronic messages available to electronic messaging client 110 and stored in remote store 132 while user device 106 was offline or while electronic messaging client 110 was not running. Such synchronization process may also be used to remove electronic messages from local store 114 that have passed outside a synchronization window.

While the synchronization process is being performed, blended state logic 124 will continue to display the item counts for a container as a sum of the local items counts for the container and the corresponding delta amounts obtained during step 406. It is possible that while the synchronization process is being performed, the local item counts will change due to such synchronization process (e.g., due to adding new electronic messages to local store 114). Thus, the item counts for the container that are displayed while the synchronization is occurring will be the total of the most current local item counts for the container (as impacted by the synchronization process) plus the corresponding delta amounts obtained during step 406.

As shown in decision step 414, once the synchronization process initiated during step 412 is determined to be complete, control flows to step 416. During step 416, blended state logic 124 obtains new remote item counts and new local items counts for the container, as such item counts may have changed as a result of the synchronization process. During step 416, blended state logic 124 also calculates new delta amounts for the container by determining the difference between each new remote item count and each corresponding new local item count. During this step, blended state logic 124 also stores the newly-calculated delta amounts in local storage of user device 106, thereby replacing the previously-calculated delta amounts with the newly-calculated delta amounts.

After step 416, control flows to step 418, during which blended state logic 124 calculates item counts for the container by summing each local item count obtained during step 416 with a corresponding delta amount calculated during that step. During step 418, blended state logic 124 also presents the item counts so calculated to GUI 132 so that they may be viewed by a user of user device 106.

Figure 5:
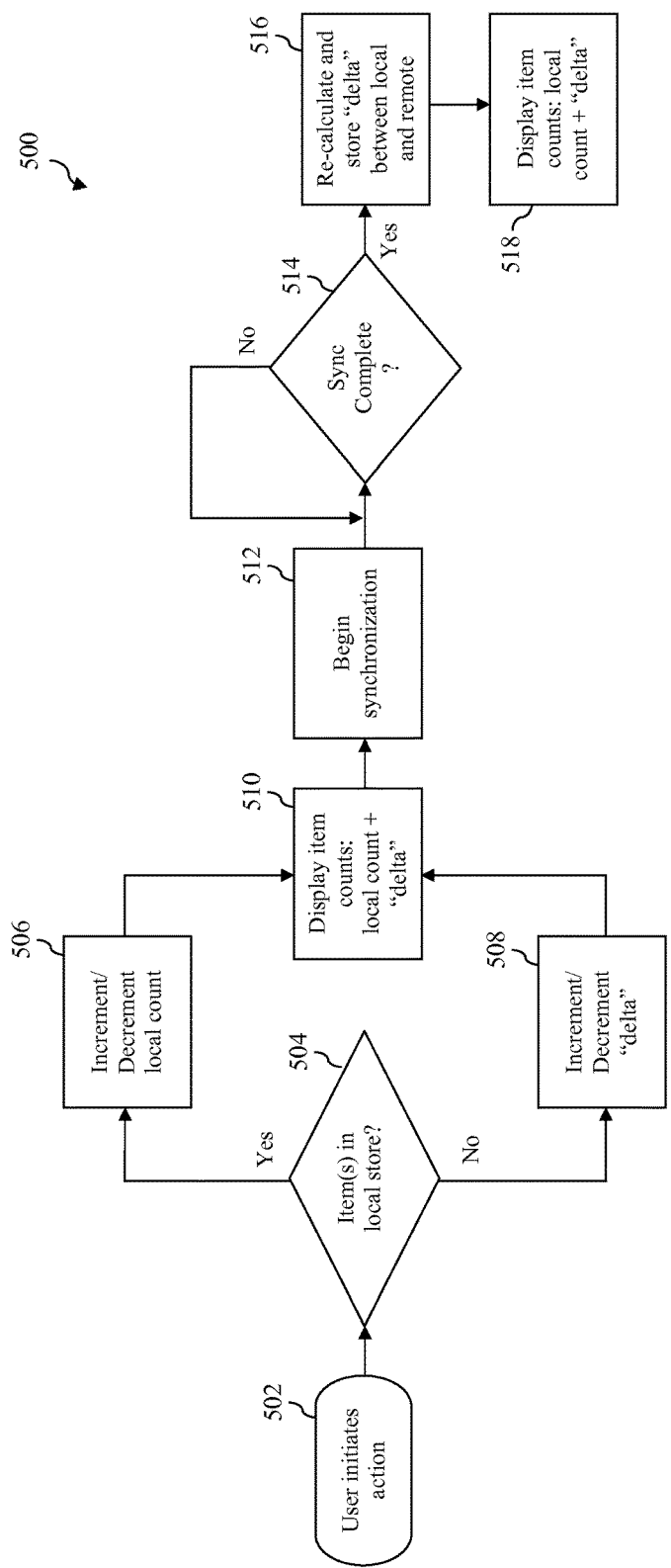
FIG. 5 depicts a flowchart of a further method for presenting a blended state associated with a container of locally-stored and remotely-stored electronic messages in accordance with an embodiment.

FIG. 5 depicts a flowchart 500 of an additional process by which blended state logic 124 may operate to present a blended state associated with a container of electronic messages to a user of user device 106 in a scenario in which some of the electronic messages stored in the container are cached in local store 114 and some of the electronic messages stored in the container are available only in remote store 132. The method of flowchart 500 is focused on the manner in which blended state is presented after the user has performed an action via electronic messaging client 110 that changes the state of an electronic message. As in the case of flowchart 400, the blended state comprises an item count that describes a number of electronic messages in the container having a particular state.

For the sake of illustration only, the method of flowchart 500 will now be described in reference to various components of system 100 as described above in reference to FIG. 1. However, persons skilled in the relevant art(s) will appreciate that the method may be implemented by other components or systems as well.

As shown in FIG. 5, the method of flowchart 500 begins at step 502, in which a user utilizes electronic messaging client 110 to perform an action on one or more electronic messages that are located in a container such that the total number of electronic messages in the container having a particular state is changed. Such action may include, for example, adding an electronic message to the container, deleting or otherwise removing an electronic message from the container, reading an unread electronic message in the container, flagging an unflagged electronic message in the container, or the like.

At decision step 504, in response to determining that the action of step 502 has occurred, blended state logic 124 determines if the electronic message(s) upon which such action has been performed are stored in local store 114. If an electronic message upon which the action has been performed is stored in local store 114, then blended state logic 124 will increment or decrement the relevant local item count for the container accordingly as shown at step 506. Thus, for example, if the user has deleted an electronic message from the container and the electronic message that was deleted was cached in local store 114, then blended state logic 124 will decrement the local item count for that container by one. As another example, if the user has read an unread electronic message in the container and the electronic message that was read is cached in local store 114, then blended state logic 124 will decrement the local unread item count for that container by one. Furthermore, blended state logic 124 may also increment the local read item count for that container by one.

However, if blended state logic 124 determines during decision step 504 that the electronic message(s) upon which the action of step 502 has been performed are not stored in local store 114 (i.e., they are only stored in remote store 132), then blended state logic 124 will increment or decrement the relevant delta amount for the container accordingly as shown at step 508. Thus, for example, if the user has deleted an electronic message from the container and the electronic message that was deleted was not cached in local store 114, then blended state logic 124 will decrement the delta amount that represents the difference between the total number of remotely-stored items in the container and the local item count for the container by one. As another example, if the user has read an unread electronic message in the container and the electronic message that was read is not cached in local store 114, then blended state logic 124 will decrement the delta amount that the represents the difference between the total number of unread remotely-stored items in the container and the local unread item count for the container by one. Furthermore, blended state logic 124 may also increment the delta amount that the represents the difference between the total number of read remotely-stored items in the container and the local read item count for the container by one.

After step 506 or 508, control flows to step 510, during which blended state logic 124 calculates item counts for the container by summing the local item counts for the container with the corresponding delta amounts. During step 510, blended state logic 124 also presents the item counts so calculated to GUI 132 so that they may be viewed by a user of user device 106.

After step 510, control flows to step 512 during which a synchronization process is initiated that is intended to synchronize the state of the electronic messages stored in local store 114 and the electronic messages stored in remote store 132. Electronic messaging client 110 may initiate such synchronization process in accordance with a system-defined or user-defined schedule, in response to the occurrence of a particular event, or the like. Such synchronization process may be necessary because the state of the electronic messages stored in local store 114 and/or remote store 132 may have changed (and thus become unsynchronized) since the occurrence of a prior synchronization. For example, the user may have changed the state of one or more electronic messages stored in local store 114 since the occurrence of a prior synchronization. As another example, electronic messaging server 102 may have changed the state of one or more electronic messages available to electronic messaging client 110 and stored in remote store 132 since the occurrence of a prior synchronization. Such synchronization process may also be used to remove electronic messages from local store 114 that have passed outside a synchronization window.

While the synchronization process is being performed, blended state logic 124 will continue to display the item counts for a container as a sum of the local items counts for the container and the corresponding delta amounts. It is possible that while the synchronization process is being performed, the local item counts will change due to such synchronization process (e.g., due to adding new electronic messages to local store 114). Thus, the item counts for the container that are displayed while the synchronization is occurring will be the total of the most current local item counts for the container (as impacted by the synchronization process) plus the corresponding delta amounts.

As shown in decision step 514, once the synchronization process initiated during step 512 is determined to be complete, control flows to step 516.

During step 516, blended state logic 124 obtains new remote item counts and new local items counts for the container, as such item counts may have changed as a result of the synchronization process. During step 516, blended state logic 124 also calculates new delta amounts for the container by determining the difference between each new remote item count and each corresponding new local item count. During this step, blended state logic 124 also stores the newly-calculated delta amounts in local storage of user device 106, thereby replacing the previously-calculated delta amounts with the newly-calculated delta amounts.

After step 516, control flows to step 518, during which blended state logic 124 calculates item counts for the container by summing each local item count obtained during step 516 with a corresponding delta amount calculated during the same step. During step 518, blended state logic 124 also presents the item counts so calculated to GUI 132 so that they may be viewed by a user of user device 106.

A simple teaching example will now be provided to help illustrate how the foregoing methods of flowcharts 400 and 500 may be utilized to present blended state information to a user. For the purposes of these examples, it is assumed that the electronic messages are e-mails, the relevant container is a folder called "Mailbox," and the item count to be displayed is the Mailbox item count.

It is to be further assumed that prior to starting electronic messaging client 110 (and thus triggering the method of flowchart 400), the local item count for the Mailbox is 50 and the delta amount for Mailbox items is 150 (i.e., when the delta amount for Mailbox items was calculated, there were 200 remotely-stored items and 50 locally-stored items in the Mailbox).

Now, assume that electronic messaging client starts in accordance with step 402 of flowchart 400 and blended state logic 124 loads the local item count for the Mailbox as set forth above in accordance with step 404 and loads the delta amount for Mailbox items as set forth above in accordance with step 406. Then, during step 408, blended state logic 124 will calculate the item count for the Mailbox as the sum of the local item count for the Mailbox (50) and the delta amount for the Mailbox items (150), yielding an item count of 200. Blended state logic 124 will then present this item count to the user via GUI 132 in further accordance with step 408.

To further illustrate how the methods of flowchart 400 and 500 may be utilized to present blended state information to a user, assume that while user device 106 is in the offline state, the user adds 5 new e-mails to the Mailbox. Since this action changes the state of the Mailbox, it will trigger step 502 of flowchart 500. Furthermore, since this action involves locally-stored e-mails, it will result in the local item count for the Mailbox being incremented by 5 (producing a local item count of 55) in accordance with step 506. Then, during step 510, the item count for the Mailbox will be shown as 205 (local item count of 55 plus delta amount of 150). Thus, it will appear to the user as if his or her actions taken offline affected the state of the entire Mailbox, not just those e-mails stored in local store 114.

To further illustrate how the methods of flowchart 400 and 500 may be utilized to present blended state information to a user, assume that while user device 106 is offline, electronic messaging server 102 receives 20 new e-mails in the Mailbox on behalf of the user and stores them in remote store 132 and also deletes 40 older e-mails in the Mailbox that are outside of a rolling time window and thus were only stored in remote store 132. This results in a remote item count for the Mailbox of 180. Assume also that after adding the 5 new e-mails to the Mailbox while user device 106 is in an offline state as discussed above, the user powers down user device 106. Later, the user powers user device 106 back on and starts electronic messaging client 110, triggering step 402 of flowchart 400.

In this case, during step 404, blended state logic 124 loads the local item count for the Inbox (local item count=55), during step 406, blended state logic 124 loads the delta amount for Mailbox items (delta amount=150), and during step 408, blended state logic 124 presents the item count for the Mailbox as 205 (55+150). Then, in decision step 410, control flows to step 412 because blended state logic 124 determines that user device 106 is now connected to electronic messaging server 102.

At step 412, synchronization is initiated. As a result of the synchronization, the 20 new e-mails in the Mailbox are downloaded to local store 114, resulting in the Mailbox local item count being incremented from 55 to 75. While synchronization is occurring, blended state logic 124 continues to display the Inbox item count as the sum of the local item count (now 75) and the delta amount for Mailbox items (150), which equals 225. During the synchronization process, the five e-mails created locally in Mailbox are uploaded to remote store 132, increasing the remote item count from 180 to 185.

During step 416, blended state logic 124 obtains post-synchronization local and remote item counts. In this case, after synchronization, the local item count for the Inbox will be 75 and the remote item count for the Inbox will be 185. Consequently, during step 416, blended state logic 124 will calculate the delta amount for the Inbox items to be 110. Next, during step 418, blended state logic 124 displays the Inbox item count as 185, which is the sum of the local item count for the Inbox (75) plus the delta amount for the Inbox items (110).

C. Example Techniques for Performance of Blended Search

Figure 6:
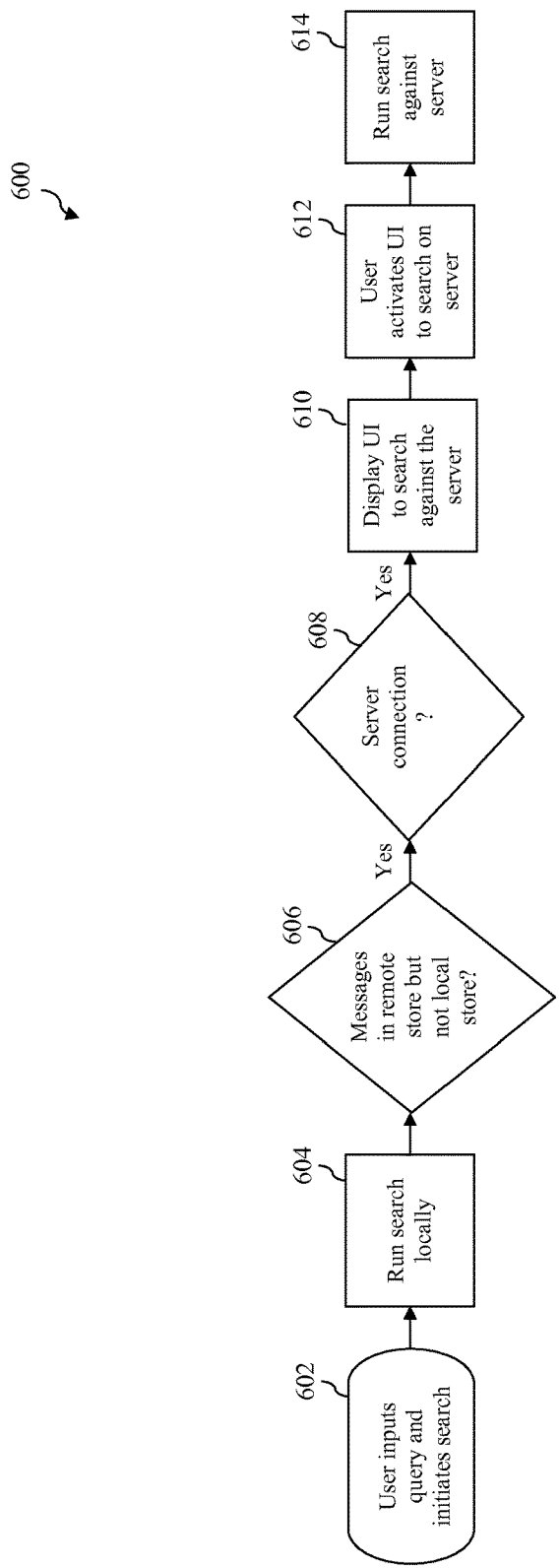
FIG. 6 depicts a flowchart of a method for performing a blended search of locally-stored and remotely-stored electronic messages in accordance with an embodiment.

FIG. 6 depicts a flowchart 600 of a first method by which blended search logic 126 may operate to performing a blended search of locally-stored and remotely-stored electronic messages in accordance with an embodiment. For the sake of illustration only, the method of flowchart 600 will now be described in reference to various components of system 100 as described above in reference to FIG. 1. However, persons skilled in the relevant art(s) will appreciate that the method may be implemented by other components or systems as well.

As shown in FIG. 6, the method of flowchart 600 begins at step 602 during which a user inputs a query into user device 106 and initiates a search. The manner in which such query may be submitted and in which such search may be initiated may depend upon the implementation. For example, in one embodiment, GUI 132 provides a text entry box that a user may use to type in a query and a search button that the user may activate to initiate the search. However, this is only one example, and a variety of well-known user input mechanisms may be used to submit the query and initiate the search.

At step 604, blended search logic 126 executes a search locally against the electronic messages stored in local store 114 based on the query submitted during step 602. Blended search logic 126 may utilize any of a variety of well-known search algorithms to determine which electronic messages stored in local store 114 should be identified as matching the query input during step 602. If blended search logic 126 determines that any electronic messages stored in local store 114 match the query, then blended search logic 126 presents information about those electronic messages in GUI 132. The information presented may broadly include any item of information about an electronic message. For example, in an embodiment in which the electronic messages comprise e-mail messages, such information may include but is not limited to a sender of the e-mail message, a subject of the e-mail message, a date and/or time the e-mail message was sent, a date and/or time the e-mail message was received, state information concerning the e-mail message (e.g., read, unread, flagged, not flagged), or the like.

In certain embodiments, for each matching electronic message about which information is presented as a result of the local search performed during step 604, a means is also presented by which a user can cause the contents of such electronic message to be displayed in GUI 132. For example, the means may comprise a component that is presented in association with the information about each electronic message that, when interacted with by the user, causes the contents of that electronic message to be displayed within GUI 132. In further accordance with such embodiments, once a user has selected an electronic message for viewing, blended search logic 126 will obtain the contents of the electronic message from local store 114 and display such contents within GUI 132.

After step 604, control flows to decision step 606 during which blended search logic 126 determines whether there are electronic messages available in remote store 132 that are not cached in local store 114. The manner in which this determination is made may vary depending upon the implementation. For example, in one embodiment, blended search logic 126 determines that there are electronic messages available in remote store 132 that are not cached in local store 114 by determining that a time-based synchronization window is being used that can result in only a subset of the electronic messages available in remote store 132 being cached in local store 114. However, other techniques may be used as well.

If blended search logic 126 determines during decision step 606 that there are no electronic messages available in remote store 132 that are not also cached in local store 114, then the method of flowchart 600 ends. However, if blended search logic 126 determines during decision step 606 that there are electronic messages available in remote store 132 that are not cached in local store 114, the control flows to decision step 608.

During decision step 608, blended search logic 126 determines whether user device 106 is connected to electronic messaging server 102 or not. A variety of methods may be used to determine if such a connection exists, including but not limited to requiring an exchange of messages between user device 106 and electronic messaging server 102 or simply determining that user device 106 has a working connection to network 104.

If blended search logic 126 determines during decision step 608 that user device 106 is not connected to electronic messaging server 102, then the method of flowchart 600 ends. However, if blended search logic 126 determines during decision step 608 that user device 106 is connected to electronic messaging server 102, then control flows to step 610.

During step 610, blended search logic causes a user interface component to be displayed within GUI 132 that, when activated by a user, will cause electronic messaging server 102 to execute a search against the available electronic messages stored in remote store 132 based on the query submitted during step 602 and to return a list that identifies any matching electronic messages. Such user interface component may include or be accompanied by a visual indication of its function. For example, the user interface component may include or be accompanied by text that states "Continue searching on the server," "Only local items have been searched, so search results may be incomplete—continue searching on the server," or the like. However, these are examples only and are not intended to be limiting.

If the user does not activate the user interface component presented to GUI 132 during step 610, then the method of flowchart 600 ends. However, if the user does activate the user interface component presented to GUI 132, as shown at step 612, then control flows to step 614.

During step 614, electronic messaging server 102 executes a search against the available electronic messages stored in remote store 132 based on the query submitted during step 602 and returns a list that identifies any matching electronic messages. Blended search logic 126 presents information about the matching electronic messages in GUI 132. The information presented may broadly include any item of information about an electronic message.

In certain embodiments, for each matching electronic message about which information is presented as a result of the remote search performed during step 614, a means is also presented by which a user can cause the contents of such electronic message to be displayed in GUI 132. For example, the means may comprise a component that is presented in association with the information about each electronic message that, when interacted with by the user, causes the contents of that electronic message to be displayed within GUI 132.

In further accordance with such embodiments, once a user has selected an electronic message for viewing, blended search logic 126 will obtain the contents of the electronic message and display such contents within GUI 132. If a copy of the selected electronic message is stored in local store 114, then blended search logic 126 will obtain the contents of the electronic message from local store 114. However, if there is no copy of the selected electronic message stored in local store 114 (i.e., the selected electronic message is outside the synchronization window), then blended search logic 126 will obtain the contents of the electronic message from remote store 132 via interaction with electronic messaging server 102. In this latter case, blended search logic 126 will not store a copy of the remotely-stored electronic message in local store 114 as part of the presentation process. That is to say, although the contents of the remotely-stored electronic message may be temporarily buffered within memory of user device 106 to facilitate the display thereof, once the user has closed the portion of GUI 132 that is used to view the contents of the remotely-stored electronic message, such buffered data may be discarded.

Figure 7:
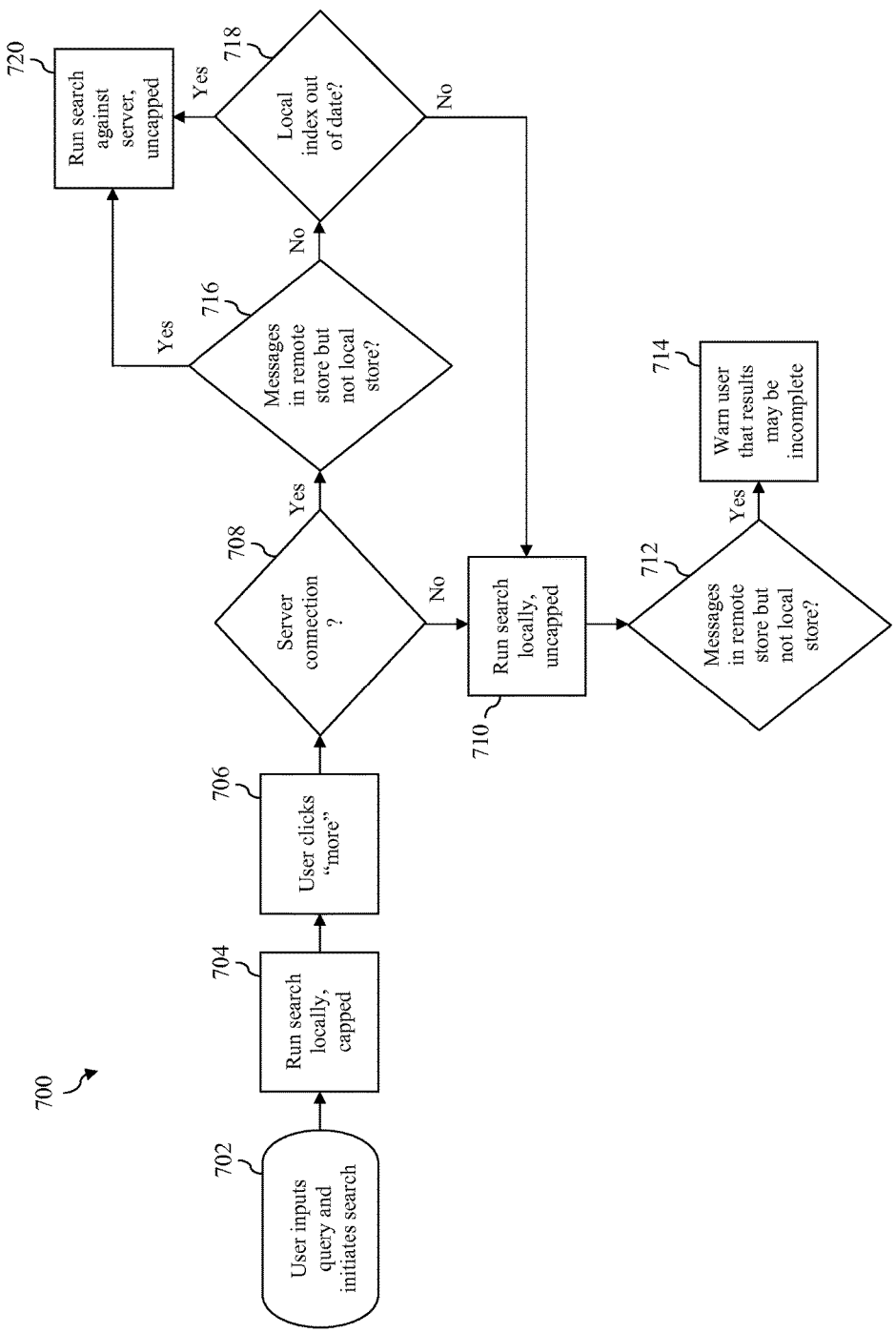
FIG. 7 depicts a flowchart of a further method for performing a blended search of locally-stored and remotely-stored electronic messages in accordance with an embodiment.

FIG. 7 depicts a flowchart 700 of a second method for performing a blended search of locally-stored and remotely-stored electronic messages in accordance with an embodiment. The method of flowchart 700 may be thought of as a variation of the method of flowchart 600 and is described herein to illustrate that a variety of alternative implementations of blended search may be used. For the sake of illustration only, the method of flowchart 700 will now be described in reference to various components of system 100 as described above in reference to FIG. 1. However, persons skilled in the relevant art(s) will appreciate that the method may be implemented by other components or systems as well.

As shown in FIG. 7, the method of flowchart 700 begins at step 702 during which a user inputs a query into user device 106 and initiates a search. The manner in which such query may be submitted and in which such search may be initiated may depend upon the implementation.

At step 704, blended search logic 126 executes a search locally against the electronic messages stored in local store 114 based on the query submitted during step 602. The search that is executed during step 704 is capped such that it will output no more than a predetermined number of matching messages, wherein the predetermined number may be less than the total number of matching messages that could be identified by the search.

During step 704, blended search logic 126 presents information about any electronic messages identified as a result of the capped local search in GUI 132. The information presented may broadly include any item of information about an electronic message. In certain embodiments, for each matching electronic message about which information is presented as a result of the capped local search performed during step 704, a means is also presented by which a user can cause the contents of such electronic message to be displayed in GUI 132. For example, the means may comprise a component that is presented in association with the information about each electronic message that, when interacted with by the user, causes the contents of that electronic message to be displayed within GUI 132. In further accordance with such embodiments, once a user has selected an electronic message for viewing, blended search logic 126 will obtain the contents of the electronic message from local store 114 and display such contents within GUI 132.

In accordance with the method of flowchart 700, as part of step 704, blended search logic 126 also provides an indication to the user via GUI 132 that there may be more search results available and presents a component by which the user can activate an additional search. For example, blended search logic 126 may present a user interface component that includes or is accompanied by the word "more," which the user can then click on to obtain additional search results. However, this is merely one example, and a wide variety of other indications and user interface components may be used. If the user does not activate the user interface component, then the method of flowchart 700 ends. However, if the user does activate the user interface component as shown in step 706, then control flows to decision step 708.

During decision step 708, blended search logic 126 determines whether user device 106 is connected to electronic messaging server 102 or not. A variety of methods may be used to determine if such a connection exists, including but not limited to requiring an exchange of messages between user device 106 and electronic messaging server 102 or simply determining that user device 106 has a working connection to network 104.

If blended search logic 126 determines during decision step 708 that user device 106 is not connected to electronic messaging server 102, then control flows to step 710. During step 710, blended search logic 126 executes an uncapped search against the electronic messages stored in local store 114 based on the query submitted during step 602. The search that is executed during step 704 is uncapped such that it will output all messages that are determined to be matching.

During step 710, blended search logic 126 presents information about any electronic messages identified as a result of the capped local search in GUI 132. The information presented may broadly include any item of information about an electronic message.

In certain embodiments, for each matching electronic message about which information is presented as a result of the uncapped local search performed during step 710, a means is also presented by which a user can cause the contents of such electronic message to be displayed in GUI 132. For example, the means may comprise a component that is presented in association with the information about each electronic message that, when interacted with by the user, causes the contents of that electronic message to be displayed within GUI 132. In further accordance with such embodiments, once a user has selected an electronic message for viewing, blended search logic 126 will obtain the contents of the electronic message from local store 114 and display such contents within GUI 132.

After step 710, control flows to decision step 712 during which blended search logic 126 determines whether there are electronic messages available in remote store 132 that are not cached in local store 114. The manner in which this determination is made may vary depending upon the implementation. For example, in one embodiment, blended search logic 126 determines that there are electronic messages available in remote store 132 that are not cached in local store 114 by determining that a time-based synchronization window is being used that can result in only a subset of the electronic messages available in remote store 132 being cached in local store 114. However, other techniques may be used as well.

If blended search logic 126 determines during decision step 712 that there are no electronic messages available in remote store 132 that are not also cached in local store 114, then the method of flowchart 700 ends. However, if blended search logic 126 determines during decision step 712 that there are electronic messages available in remote store 132 that are not cached in local store 114, the control flows to step 714, during which blended search logic 126 provides an indication or warning to the user via GUI 132 that the results of the uncapped local search may be incomplete.

As noted above, during decision step 708, blended search logic 126 determines whether user device 106 is connected to electronic messaging server 102 or not. If blended search logic 126 determines during decision step 708 that user device 106 is connected to electronic messaging server 102, then control flows to decision step 716.

During decision step 716, blended search logic 126 determines whether there are electronic messages available in remote store 132 that are not cached in local store 114. If blended search logic 126 determines during decision step 716 that there are no electronic messages available in remote store 132 that are not also cached in local store 114, then control flows to decision step 718.

During decision step 718, blended search logic 126 determines if a search index that is locally stored with respect to user device 106 is out of date. If blended search logic 718 determines that the search index is not out of date, then control flows to step 710, which was previously described.

If blended search logic 126 determines during decision step 716 that there are electronic messages available in remote store 132 that are not cached in local store 114 or if blended search logic 126 determines during decision step 718 that the search index is out of date, then control flows to step 720. During step 720, electronic messaging server 102 executes an uncapped search against the available electronic messages stored in remote store 132 based on the query submitted during step 702 and returns a list that identifies any matching electronic messages. Blended search logic 126 presents information about the matching electronic messages in GUI 132. The information presented may broadly include any item of information about an electronic message.

In certain embodiments, for each matching electronic message about which information is presented as a result of the remote search performed during step 720, a means is also presented by which a user can cause the contents of such electronic message to be displayed in GUI 132. For example, the means may comprise a component that is presented in association with the information about each electronic message that, when interacted with by the user, causes the contents of that electronic message to be displayed within GUI 132.

In further accordance with such embodiments, once a user has selected an electronic message for viewing, blended search logic 126 will obtain the contents of the electronic message and display such contents within GUI 132. If a copy of the selected electronic message is stored in local store 114, then blended search logic 126 will obtain the contents of the electronic message from local store 114. However, if there is no copy of the selected electronic message stored in local store 114 (i.e., the selected electronic message is outside the synchronization window), then blended search logic 126 will obtain the contents of the electronic message from remote store 132 via interaction with electronic messaging server 102. In this latter case, blended search logic 126 will not store a copy of the remotely-stored electronic message in local store 114 as part of the presentation process. That is to say, although the contents of the remotely-stored electronic message may be temporarily buffered within memory of user device 106 to facilitate the display thereof, once the user has closed the portion of GUI 132 that is used to view the contents of the remotely-stored electronic message, such buffered data may be discarded.

In accordance with an alternate embodiment, a user inputs a query into user device 106 and initiates a search. If blended search logic 126 determines that user device 106 is connected to electronic messaging server 102, then electronic messaging server 102 executes an uncapped search against the available electronic messages stored in remote store 132 based on the query and returns a list that identifies any matching electronic messages without any further input from the user. The information about the matching electronic messages may be presented in GUI 132 using a blended view, such that the contents of locally-cached matching electronic messages may be accessed from local store 114 while the contents of matching electronic messages that are not locally cached may be accessed from remote store 132.

In accordance with a still further embodiment, a user inputs a query into user device 106 and initiates a search. Blended search logic 126 executes the search against the electronic messages stored in local store 114 and also automatically causes an uncapped search to be run against the electronic messages available in remote store 132 when user device 106 is connected to electronic messaging server 102. In accordance with such an embodiment, blended search logic 126 can first present the user with the results of the local search (which may yield results more quickly than the remote search) and then present a full blended view of all the matching electronic messages available in remote store 132 when the results of the remote search are returned. All of this can occur without any additional input from the user beyond submitting the query and initiating the search.

III. Example Processor-Based System Implementation

Figure 8:
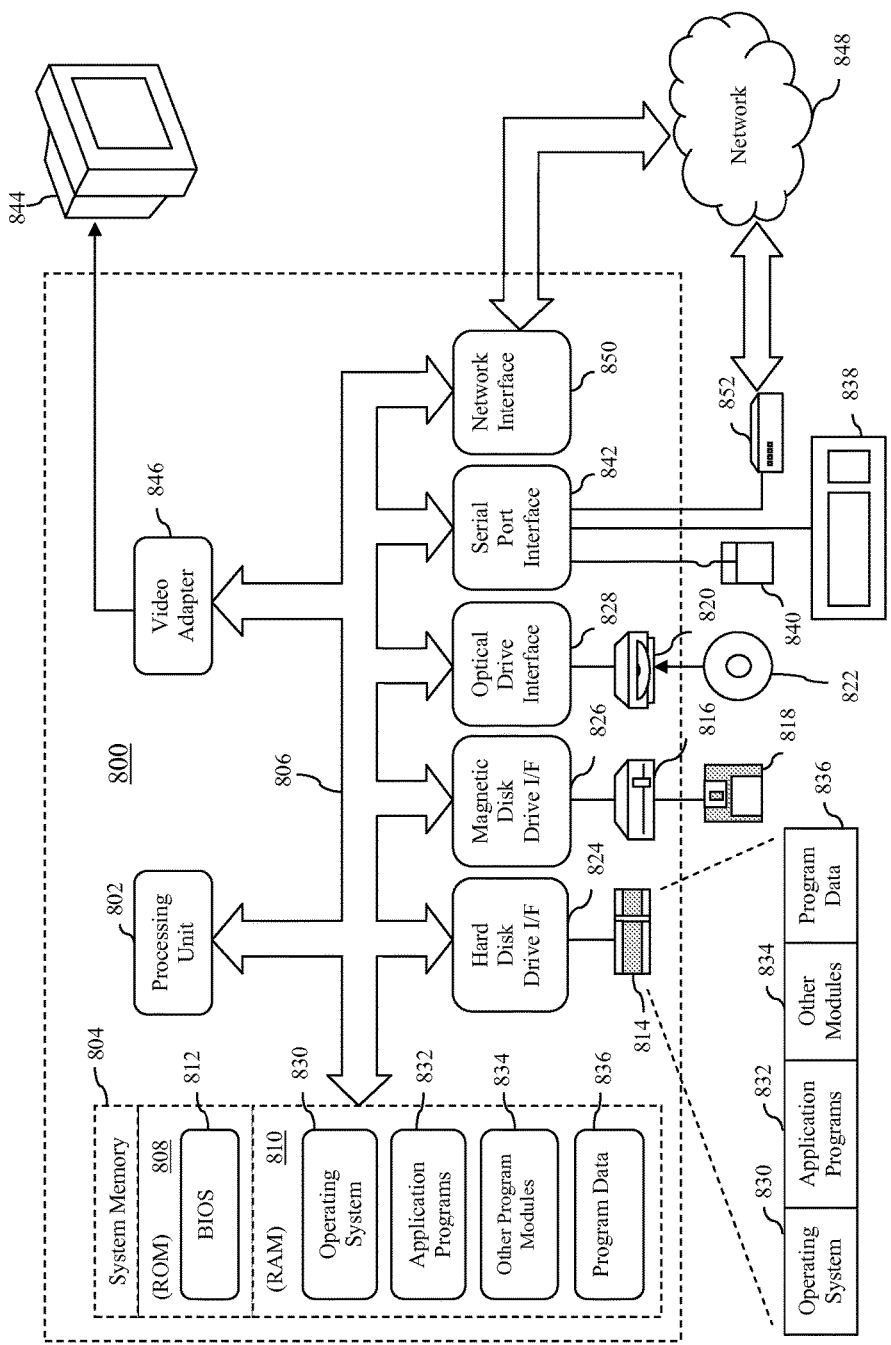
FIG. 8 is a block diagram of an example processor-based system that may be used to implement various embodiments.

FIG. 8 depicts an example processor-based computer system 800 that may be used to implement various embodiments described herein. For example, system 800 may be used to implement either or both of electronic messaging server 102 and user device 106, as well as various sub-components thereof. The description of system 800 provided herein is provided for purposes of illustration, and is not intended to be limiting. Embodiments may be implemented in further types of computer systems, as would be known to persons skilled in the relevant art(s).

As shown in FIG. 8, system 800 includes a processing unit 802, a system memory 804, and a bus 806 that couples various system components including system memory 804 to processing unit 802. Processing unit 802 may comprise one or more processors or processing cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all of the functions and features of electronic messaging server 102 and user device 106, as well as any sub-components thereof, as described elsewhere herein. The program modules may also include computer program logic that, when executed by processing unit 802, performs any of the steps or operations shown or described in reference to FIGS. 2-7.

A user may enter commands and information into system 800 through input devices such as a keyboard 838 and a pointing device 840. Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB).

A display 844 is also connected to bus 806 via an interface, such as a video adapter 846. In addition to display 844, system 800 may include other peripheral output devices (not shown) such as speakers and printers.

System 800 is connected to a network 848 (e.g., a local area network or wide area network such as the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to non-transitory media such as ROM 808 and RAM 810 used to implement system memory 804, the hard disk associated with hard disk drive 814, removable magnetic disk 818, removable optical disk 822, as well as other media such as flash memory cards, digital video disks, and the like.

As noted above, computer programs and modules (including application programs 832 and other program modules 834) may be stored on ROM 808, RAM 810, the hard disk, magnetic disk, or optical disk. Such computer programs may also be received via network interface 850 or serial port interface 842. Such computer programs, when executed by processing unit 802, enable system 800 to implement features of embodiments discussed herein. Accordingly, such computer programs represent controllers of system 800.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as ROM, RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, each of electronic messaging server 102 and user device 106, as well as any sub-components thereof, may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method performed by an electronic messaging client installed on a user device, comprising:
    displaying information and content corresponding to one or more first electronic messages in a graphical user interface rendered on a display of the user device, wherein the one or more first electronic messages have time information that corresponds to a user-configurable time frame having a specified start time and end time associated with a synchronization window, the synchronization window configured to shift forward in time after a predetermined amount of time has passed, and wherein the information and content of the one or more first electronic messages is stored in a local, nonvolatile storage device of the user device;
    displaying an indication of one or more second electronic messages that are different than the one or more first electronic messages, the one or more second electronic messages being stored on a remote store associated with the electronic messaging server and not stored in the local, nonvolatile storage device of the user device, wherein the one or more second electronic messages have time information that falls outside the time frame associated with the synchronization window;
    receiving a first user interaction with the indication of the one or more second electronic messages;
    in response to receiving the first user interaction with the indication of the one more second electronic messages, retrieving information and content corresponding to the one or more second electronic messages;
    temporarily storing the information and content corresponding to the one or more second electronic messages in a buffer of the user device, the buffer being separate from the local, nonvolatile storage device; and
    displaying the information and content corresponding to the one or more second electronic messages in the graphical user interface concurrently with the information and content corresponding to the one or more first electronic messages in the graphical user interface, wherein the one or more second electronic messages are removed from the buffer when the electronic messaging client is closed.

2. The method of claim 1, further comprising:
    providing a component within the graphical user interface that causes the information and content corresponding to the one or more second electronic messages to be displayed in the graphical user interface concurrently with the information and content corresponding to the one or more first electronic messages.

3. The method of claim 1, further comprising:
    providing a component within the graphical user interface that causes the content of a selected one of the one or more first electronic messages to be displayed in the graphical user interface;
    receiving a second user interaction with the component; and
    in response to receiving the second user interaction with the component, obtaining the content of the selected one of the one or more first electronic messages from the local store for display in the graphical user interface.

4. The method of claim 1, further comprising:
    providing a component within the graphical user interface that causes the content of a selected one of the one or more second electronic messages to be displayed in the graphical user interface;
    determining that the component has been interacted with; and
    in response to the determining that the component has been interacted with:
        obtaining the content of the selected one of the one or more second electronic messages from the remote store for display in the graphical user interface; and
        temporarily buffering the content of the selected one of the one or more second electronic messages in the buffer of the user device without saving a copy of the contents of the selected one of the one or more second electronic messages in the local, nonvolatile storage device.

5. The method of claim 1, further comprising providing a component for changing the time frame of the synchronization window.

6. The method of claim 1, wherein the one or more first electronic messages and the one or more second electronic messages comprise e-mail messages.

7. The method of claim 1, wherein receiving a first user interaction with the indication of the one or more second electronic messages comprises receiving a selection of the indication of the second plurality of electronic messages.

8. A method performed by an electronic messaging client installed on a user device, comprising:
    receiving a query, containing one or more terms, on the user device;
    executing a first search against a first plurality of electronic messages cached in a local store of the user device using the one or more terms of the query, the local store comprising nonvolatile storage, wherein the plurality of electronic messages cached in the local store have time information that falls within a user-configurable time frame having a specified start time and end time and associated with a rolling time-based synchronization window configured to the shift forward in time after a predetermined amount of time has passed;

displaying information about at least one electronic message identified as a result of the execution of the first search in a graphical user interface rendered on a display of the user device;

displaying an indication of a second plurality of electronic messages available in a remote store but not in the local store, the second plurality of electronic messages being different than the first plurality of electronic messages, wherein the plurality of electronic messages available in the remote store have time information that falls outside the time frame associated with the synchronization window;

receiving a first user interaction with the indication of the second plurality of electronic messages;

executing a second search, using the one or more terms of the query, against the second plurality of electronic messages; and displaying information about at least one electronic message identified as a result of the execution of the second search in the graphical user interface, the information about the at least one electronic message identified as a result of the execution of the second search being temporarily buffered in a memory of the user device that is separate from the local store, wherein the one or more second electronic messages are removed from the buffer when the electronic messaging client is closed.

9. The method of claim 8, wherein the second search is executed in response to received input.

10. The method of claim 8, further comprising:
concurrently displaying information about a first electronic message that is cached in the local store and information about a second electronic message that is not cached in the local store in the graphical user interface as a result of the execution of the second search;

in response to user interaction with a first component of the graphical user interface, obtaining the contents of the first electronic message from the local store for display in the graphical user interface; and in response to user interaction with a second component of the graphical user interface, accessing the contents of the second electronic message from the remote store for display in the graphical user interface and temporarily buffering the contents of the second electronic message in the memory of the user device without saving a copy of the contents of the second electronic message in the local store.

11. The method of claim 8, wherein the indication of the second plurality of electronic messages indicates that the results of the first search may be incomplete.

12. The method of claim 8, wherein the plurality of electronic messages comprise e-mail messages.

13. The method of claim 8, further comprising downloading the at least one electronic message in its entirety as a result of executing the second search.

14. The method of claim 8, wherein receiving a first user interaction with the indication of the second plurality of electronic messages comprises receiving a selection of the indication of the second plurality of electronic messages.

15. A system, comprising:
at least one processor; and
a memory coupled to the at least one processor and storing instructions that, when executed by the at least one processor, perform a method, comprising:
receiving a query containing one or more terms;
executing a first search against a first plurality of electronic messages cached in a local store using the one or more terms of the query, wherein the local store comprises nonvolatile storage and wherein the plurality of electronic messages cached in the local store have time information that falls within a user-configurable time frame having a specified start time and end time and associated with a rolling time-based synchronization window, the rolling time-based synchronization window configured to shift forward in time after a predetermined amount of time has passed;

displaying, in a graphical user interface, information about at least one electronic message identified as a result of the execution of the first search;

displaying an indication of a second plurality of electronic messages available in a remote store but not in the local store, wherein the second plurality of electronic messages are different from the first plurality of electronic messages and have time information that falls outside the time frame specified by the synchronization window;

receiving a first interaction with the indication of the second plurality of electronic messages;

executing a second search, using the one or more terms of the query, against the second plurality of electronic messages; and displaying information about at least one electronic message identified as a result of the execution of the second search in the graphical user interface, wherein the information about the at least one electronic message identified as a result of the execution of the second search is temporarily buffered in a memory that is separate from the local store, wherein the one or more second electronic messages are removed from the buffer when the electronic messaging client is closed.

16. The system of claim 8, further comprising instructions for downloading the at least one electronic message identified as a result of the execution of the second search in its entirety.

17. The system of claim 8, wherein the second search is executed in response to received input.

18. The system of claim 8, wherein the indication of the second plurality of electronic messages indicates that the results of the first search may be incomplete.

19. The system of claim 8, wherein the plurality of electronic messages comprise e-mail messages.

20. The system of claim 15, wherein receiving a first interaction with the indication of the second plurality of electronic messages comprises receiving a selection of the indication of the second plurality of electronic messages.

\* \* \* \* \*